Feb. 23, 1932.    R. H. SPELMAN    1,846,155
CHUTE CLAMP
Filed Sept. 24, 1929
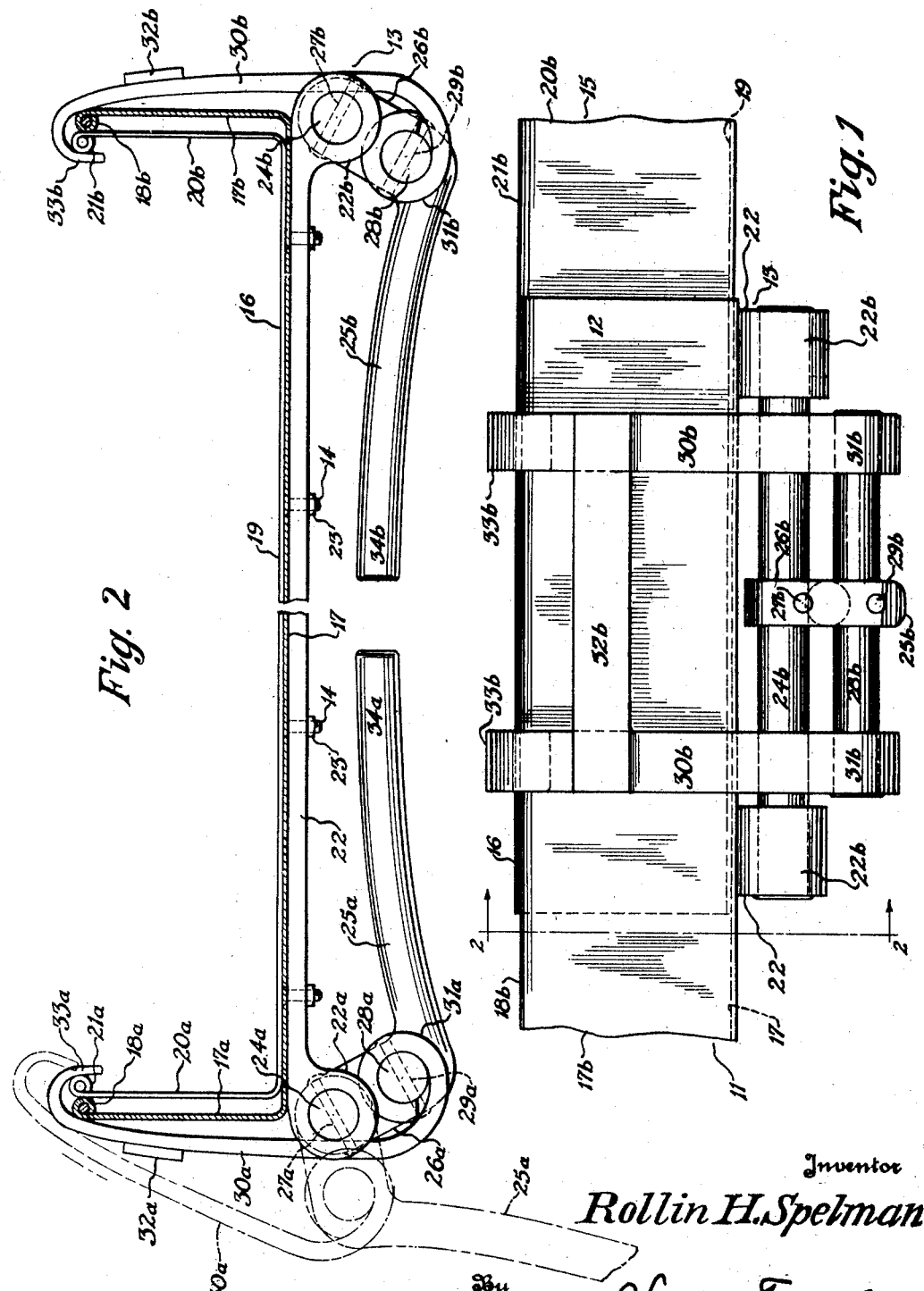
Inventor
Rollin H. Spelman
By Harry Frease
Attorney Patented Feb. 23, 1932

1,846,155

UNITED STATES PATENT OFFICE

ROLLIN H. SPELMAN, OF CANTON, OHIO

CHUTE CLAMP

Application filed September 24, 1929. Serial No. 394,804.

My invention relates to clamps, more particularly for use in connecting together coal chutes, in order to make a long chute from two or more relatively short chutes.

In handling coal, it is frequently necessary to use a relatively long chute, but it is undesirable to transport a long chute from place to place on a coal wagon, because one end of the chute overhangs the end of the wagon, and is damaged either by collision or by vibration.

Moreover a long chute is not always required, and it is inconvenient to handle a long chute by reason of its weight and length when a short chute will meet the requirements of the particular job.

It has heretofore proven very difficult to connect easily and quickly adjacent ends of relatively short coal chutes to each other to form a long chute, primarily because of the usual coal chute made from a metallic sheet is in the form of a relatively wide and shallow trough comprising a central longitudinally extending web forming the base of the trough, and relatively short flanges extending in the same direction from the sides of the web, and forming the sides of the trough.

It is necessary to secure the webs and sides of the adjacent ends of the chutes to each other, and no satisfactory clamp or other means for fastening the ends of coal chutes together is at present generally available.

The objects of the present invention include the provision of a clamp for connecting adjacent ends of coal chutes to each other for forming a long chute from relatively short chutes, and the clamp rigidly maintaining the connected chute ends, and being quickly and easily operated in use.

These objects are attained in the present invention, as will be set forth in greater detail hereinafter and claimed.

A preferred embodiment of the invention is illustrated in the accompanying drawings forming part hereof, in which Figure 1 is a fragmentary side elevation illustrating a preferred embodiment of the improved chute clamp in use for rigidly securing adjacent and telescoping ends of two coal chutes to each other;

Fig. 2, a fragmentary sectional view thereof as on line 2—2, Fig. 1, the clamp being illustrated in full lines in clamping position, and at one side in dot and dash lines parts of the clamp are shown in one position assumed during the application or release of the clamp.

Similar numerals refer to similar parts throughout the several views.

The chute 11 for coal or the like is preferably relatively short for being carried without overhanging on a usual coal wagon or the like, and for being easily handled, and includes one end 12 upon which the improved clamp indicated generally at 13 is preferably secured as by bolts 14, although the clamp will operate satisfactorily without being secured to the chute 11 by the bolts 14.

Another coal chute 15 includes an end 16 which telescopes within the end 12 of the chute 11.

Each of the chutes is preferably in the form of a relatively wide shallow trough; and the chute 11 includes a central relatively wide and longitudinally extending web member 17 forming the bottom of the trough, and side members 17a and 17b extending in the same direction from opposite sides of the web member and forming the sides of the trough. The longitudinal edges 18a and 18b of the trough side members 17a and 17b, respectively, are preferably beaded and wired as illustrated.

The chute 15 includes a central relatively wide and longitudinally extending web member 19 forming the bottom of the trough, and side members 20a and 20b extending in the same direction from opposite sides of the web member and forming the sides of the trough. The longitudinal edges 21a and 21b of the trough side members 20a and 20b, respectively, are preferably beaded and wired as illustrated.

The width of the trough 15 between the slide members 20a and 20b is preferably less than the width of the trough 11 between the side members 17a and 17b, so that the end 16 of the trough 15 may telescope within the end 12 of the trough 11.

The web member 17 of the trough 11 at the end 12, is provided with countersunk apertures for receiving the heads of the bolts 14 which preferably secure the clamp 13 to the chute, as aforesaid.

The clamp 13 includes web bars 22 extending transversely below the web member 17, and spaced longitudinally thereof; and the shanks of the bolts 14 extend through the web member 17 and the web bars 22, nuts 23 for the bolts being positioned on the outside of the web bars 22.

A bearing 22a is formed at one end of each web bar 22; and similarly a bearing 22b is formed at the other end of each web bar 22.

A longitudinally extending shaft 24a is journalled in the bearings 22a, and similarly a longitudinally extending shaft 24b is journalled in the bearings 22b.

A preferably angled clamping lever 25a is secured at one end 26a to the shaft 24a intermediate the bearings 22a, preferably by locating the shaft 24a within a suitable aperture formed in the end 26a of the lever, and by placing a pin 27a in suitable registering apertures formed in the lever end and in the shaft.

Similarly a preferably angled clamping lever 25b is secured at one end 26b to the shaft 24b intermediate the bearings 22b, preferably by locating the shaft 24b within a suitable aperture formed in the end 26b of the lever, and by placing a pin 27b in suitable registering apertures formed in the lever end and in the shaft.

Intermediate the ends of the lever 25a and preferably adjacent the shaft 24a for attaining a maximum leverage, a longitudinally extending hook shaft 28a is secured to the lever 25a, preferably by locating the hook shaft 28a within a suitable aperture formed in the lever, and by positioning a pin 29a in suitable registering apertures formed in the lever and in the hook shaft.

Similarly, intermediate the ends of the lever 25b and preferably adjacent the shaft 24b for attaining a maximum leverage, a longitudinally extending hook shaft 28b is secured to the lever 25b, preferably by locating the hook shaft 28b within a suitable aperture formed in the lever, and by positioning a pin 29b in suitable registering apertures formed in the lever and in the hook shaft.

The connection between the lever 25a and the hook shaft 28a is preferably midway between the ends of the hook shaft 28a.

Longitudinally spaced hook arms 30a are each provided with a bearing 31a at their lower ends, and each end of the hook shaft 28a is journalled in the bearing 31a of one of the hook arms.

The hook arms 30a extend upwardly from their bearings 31a on the outside of the shafts 24a, and a longitudinally extending strap 32a is secured at its ends to the hook arms 30a for enabling simultaneous oscillation of the arms on the hook shaft 28a.

Each hook arm 30a terminates at its outer end in a downwardly opening hook 33a, which is adapted to hook and clamp over the side by side wired and beaded edges 18a and 21a of the chute side members 17a and 20a.

Similarly, the connection between the lever 25b and the hook shaft 28b is preferably midway between the ends of the hook shaft 28b.

Longitudinally spaced hook arms 30b are each provided with a bearing 31b at its lower ends, and each end of the hook shaft 28b is journalled in the bearing 31b of one of the hook arms.

The hook arms 30b extend upwardly from their bearings 31b on the outside of the shaft 24b, and a longitudinally extending strap 32b is secured at its ends to the hook arms 30b for enabling simultaneous oscillation of the arms on the hook shaft 28b.

Each hook arm 30b terminates at its outer end in a downwardly opening hook 33b, which is adapted to hook and clamp over the side by side wired and beaded edges 18b and 21b of the chute side members 17b and 20b.

The outer handle ends 34a and 34b of the angled lever arms 25a and 25b, respectively, are angled towards the chute webs; so that, in the clamped position, the handles will be swung up out of the way beneath the chute webs.

In use, the end 16 of the chute 15 is telescoped within the end 12 of the chute 11, so that the end 16 extends over both web bars 22. The lever arms 25a and 25b are swung outwardly and the hooks 33a and 33b are hooked over the wired and beaded chute side edges 18a and 21a, and 18b and 21b, respectively.

The handles 34a and 34b are then swung inwardly to the clamping positions illustrated in full lines in Fig. 2, whereby the hooks are clamped downwardly upon the chute sides, the hook shafts 28a and 28b being swung from the outside of the shafts 24a and 24b, respectively, to the inside thereof, and the hook arms 30a and 30b being curved for fitting around the shafts 24a and 24b in the clamping position.

Maximum pressure upon the chute sides between the hooks 33a and 33b and the shafts 24a and 24b, respectively, is attained when the hook shafts 28a and 28b, respectively, reach the vertical planes passing through the axes of the shafts 24a and 24b, respectively, as viewed in Fig. 2.

Further rotation of the lever arms 25a and 25b serves to lock the clamps in chute engaging position, until released by swinging the lever arms in the opposite direction.

One position of the lever 25a and the hook arm 30a during a clamping or releasing operation is illustrated in dot and dash lines in Fig. 2.

The hook arms 30a are longitudinally spaced from each other, as are the hook arms 30b, for clamping the telescoped chute ends 12 and 16 at longitudinally spaced positions, whereby bending of the connected chutes at the telescopic joint is prevented.

If clamping were not provided at the longitudinally spaced positions on the telescoped chute ends, that is to say, if a single set of hook arms were used, the connected chutes would tend to bend at the joint, and would be unsatisfactory for use.

I claim:

1. A clamp for clamping telescoped ends of chutes and the like each including a web and two sides, the clamp including a transverse member for location beneath the telescoped webs, means mounted on the transverse member for engaging one set of telescoped sides, and releasable clamping means operatively mounted on the transverse member, the clamping means including a hook for engaging the outer edges of the other set of sides, and a lever operatively interposed between the hook and the transverse member.

2. A clamp for clamping telescoped ends of chutes and the like each including a web and two sides, the clamp including a transverse member for location beneath the telescoped webs, and releasable clamping means operatively mounted at opposite ends of the transverse member, the clamping means including a plurality of hooks each adapted for engaging the outer edges of one of the sets of telescoped sides, and a lever operatively interposed between each hook and the transverse member.

3. A clamp for clamping telescoped ends of chutes and the like each including a web and two sides, the clamp including a transverse member for location beneath the telescoped webs, means mounted on the transverse member for engaging one set of telescoped sides, and releasable clamping means operatively mounted on the transverse member, the clamping means including longitudinally spaced hooks for engaging the outer edges of the other set of sides, and a lever operatively interposed between the hooks and the transverse member.

4. A clamp for clamping telescoped ends of chutes and the like each including a web and two sides, the clamp including a transverse member for location beneath the telescoped webs, and releasable clamping means operatively mounted on the transverse member, the clamping means including longitudinally spaced hooks for engaging the outer edges of the other set of sides, and a lever operatively interposed between the hooks and the transverse member.

5. A clamp for clamping telescoped ends of chutes and the like each including a web and two sides, the clamp including longitudinally spaced transverse members for location beneath the telescoped webs, means mounted on the transverse members for engaging one set of telescoped sides, and releasable clamping means operatively mounted on the transverse members, the clamping means including a hook for engaging the outer edges of the other set of sides, and a lever operatively interposed between the hook and the transverse member.

6. A clamp for clamping telescoped ends of chutes and the like each including a web and two sides, the clamp including longitudinally spaced transverse members for location beneath the telescoped webs, and releasable clamping means operatively mounted at opposite ends of the transverse members, the clamping means including a plurality of hooks each adapted for engaging the outer edges of one of the sets of telescoped sides, and a lever operatively interposed between each hook and the transverse member.

7. A clamp for clamping telescoped ends of chutes and the like each including a web and two sides, the clamp including longitudinally spaced transverse members for location beneath the telescoped webs, means mounted on the transverse members for engaging one set of telescoped sides, and releasable clamping means operatively mounted on the transverse members, the clamping means including longitudinally spaced hooks for engaging the outer edges of the other set of sides, and a lever operatively interposed between the hook and the transverse member.

8. A clamp for clamping telescoped ends of chutes and the like each including a web and two sides, the clamp including longitudinally spaced transverse members for location beneath the telescoped webs, and releasable clamping means operatively mounted on the transverse members, the clamping means including longitudinally spaced hooks for engaging the outer edges of the other set of sides, and a lever operatively interposed between the hooks and the transverse member.

In testimony that I claim the above, I have hereunto subscribed my name.

ROLLIN H. SPELMAN.